US008064079B2

(12) United States Patent  (10) Patent No.: US 8,064,079 B2
Kimura  (45) Date of Patent: Nov. 22, 2011

(54) METHOD FOR NOTIFYING STATE OF PRINTING PROCESSING, INFORMATION PROCESSING DEVICE, AND INFORMATION PROCESSING PROGRAM

(75) Inventor: Mitsuo Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/826,804

(22) Filed: Apr. 15, 2004

(65) Prior Publication Data

US 2004/0212821 A1 Oct. 28, 2004

(30) Foreign Application Priority Data

Apr. 24, 2003 (JP) ................... 2003-120494

(51) Int. Cl.
*G06F 15/16* (2006.01)
*G06F 15/173* (2006.01)
*G06F 15/00* (2006.01)
*G06F 17/00* (2006.01)
*H04N 1/00* (2006.01)
*H04N 1/46* (2006.01)

(52) U.S. Cl. ......... 358/1.15; 358/403; 358/501; 705/64; 709/219; 709/224; 709/217

(58) Field of Classification Search ............ 358/1.1, 358/1.14, 1.15, 1.13; 709/224, 219, 203; 705/64; 715/500, 274
See application file for complete search history.

(56) References Cited

U.S. PATENT DOCUMENTS

| | | | | | |
|---|---|---|---|---|---|
| 5,799,206 | A | * | 8/1998 | Kitagawa et al. | 358/1.13 |
| 6,029,238 | A | * | 2/2000 | Furukawa | 358/1.16 |
| 6,115,132 | A | * | 9/2000 | Nakatsuma et al. | 358/1.14 |
| 6,552,813 | B2 | * | 4/2003 | Yacoub | 358/1.1 |
| 6,604,212 | B2 | * | 8/2003 | Sekizawa | 358/1.14 |
| 6,681,349 | B2 | * | 1/2004 | Sekizawa | 358/1.15 |
| 6,829,059 | B1 | * | 12/2004 | Kimura | 358/1.15 |
| 7,239,409 | B2 | * | 7/2007 | Parry | 358/1.15 |
| 2002/0093676 | A1 | * | 7/2002 | Parry | 358/1.15 |
| 2002/0138612 | A1 | * | 9/2002 | Sekizawa | 709/224 |
| 2003/0011805 | A1 | * | 1/2003 | Yacoub | 358/1.15 |
| 2003/0014368 | A1 | * | 1/2003 | Leurig et al. | 705/64 |
| 2003/0046334 | A1 | * | 3/2003 | Simpson | 709/203 |
| 2003/0048470 | A1 | * | 3/2003 | Garcia | 358/1.15 |
| 2003/0081242 | A1 | * | 5/2003 | Simpson et al. | 358/1.15 |
| 2003/0172148 | A1 | * | 9/2003 | Simpson et al. | 358/1.15 |
| 2004/0010567 | A1 | * | 1/2004 | Moyer et al. | 709/219 |
| 2004/0046986 | A1 | * | 3/2004 | Kuwabara et al. | 358/1.14 |
| 2004/0059995 | A1 | * | 3/2004 | Takabayashi et al. | 715/500 |
| 2005/0185211 | A1 | * | 8/2005 | Foehr et al. | 358/1.15 |

FOREIGN PATENT DOCUMENTS

JP 2000-284937 10/2000

* cited by examiner

*Primary Examiner* — Chan S Park
*Assistant Examiner* — Akwasi M Sarpong
(74) *Attorney, Agent, or Firm* — Canon U.S.A., Inc., IP Division

(57) ABSTRACT

A method for enabling a user of a client to see whether or not printing is completed is provided. A Web print server generates data in accordance with a printing request sent from the client, and sends the data to a printer device. In accordance with reception of the printing request sent from the client, the Web print server sends a request for acquiring a Web page to the client. The client receives the request for acquiring the Web page from the Web print server, and acquires a Web page indicating the state of processing of a print job in the printer device, the Web page being sent from the printer device. The Web page is displayed on a display unit.

19 Claims, 13 Drawing Sheets

FIG. 8

PRINTING REQUEST

USER ID    7 1 2 3 4

PASSWORD    * * * * *

PRINT DESTINATION PRINTER    ¥¥p.serv01¥LBP930-2    REFER

TEXT EXTRACTION METHOD

- ● DESIGNATE NAME OF FILE
- ○ DESIGNATE NAME OF DOCUMENT
- ○ DESIGNATE RETRIEVAL CONDITION
- ○ DESIGNATE NAME OF PROCESSING PROGRAM

OK    CANCEL

FIG. 9

JOB RECORD

| RECEIPT NUMBER | NAME OF JOB | STATE | NAME OF USER | DATE AND TIME |
|---|---|---|---|---|
| 3891 | OPERATIONAL SPECIFICATION | PRINTING | Administrator | 2002/04/19 18:17:00 |
| 3892 | ADDRESS LIST | STANDBY | Tanaka | 2002/04/19 18:19:10 |
| 3893 | PERFORMANCE MANAGEMENT LIST | STANDBY | Takahashi | 2002/04/19 18:23:22 |

FIG. 13

| RECEIPT NUMBER |
| 3891 |
| NAME OF JOB |
| OPERATIONAL SPECIFICATION |
| STATE |
| PRINTING |
| NAME OF USER |
| Administrator |
| DATE AND TIME |

METHOD FOR NOTIFYING STATE OF PRINTING PROCESSING, INFORMATION PROCESSING DEVICE, AND INFORMATION PROCESSING PROGRAM

BACKGROUND OF THE INVENTION

1. Field of the Invention

The present invention relates to methods for notifying the state of printing processing and to information processing devices. For example, the present invention relates to a method for notifying the state of printing processing, the method being applied to a printing system in which a server, a client, and a printer device can communicate with each other via a communication line, and to an information processing device capable of communicating with an external device and a printer device via a communication line.

2. Description of the Related Art

Printing systems have been known in which form data for printing is stored in a nonvolatile storage device or the like, so-called form overlay processing, such as overlaying the form data on printing data, is performed, and a printer performs printing using the data obtained by the form overlay processing.

Also, a method is widely used in which a client server system distributes form data for printing to each client personal computer (PC) and performs overlay processing on each client PC so that a printer performs printing.

Such form overlay processing has advantages of easily changing and controlling a printing form and performing printing by transferring only printing data as long as the print form does not need to be changed at the time of printing.

Furthermore, recently, a printing system has been proposed in which a Web print server distributes printing data (if necessary, together with the latest form data) to a printer device in accordance with a printing request sent from a client PC and in which this distribution allows printing processing based on the latest form to be performed at high speed without burdening a network.

However, the known printing system in which the Web print server distributes printing data to the printer device has a problem in that there is no means for a user of a client PC to see whether or not printing is completed in a case where the location of the printer device is distant from the location of the client PC.

SUMMARY OF THE INVENTION

The present invention is designed in consideration of the problem described above, and the present invention provides a method for notifying the state of printing processing, the method enabling a user of a client to see whether or not printing is completed.

According to an aspect of the present invention, a method is provided for notifying the state of printing processing. The method is applied to a printing system in which a server is capable of communicating with a client and a printer device. The method is implemented by the server and includes: generating data in accordance with a printing request received from the client; transmitting the data generated to the printer device; transmitting, to the client, information for acquiring a Web page indicating the state of processing of a print job, the Web page being provided by the printer device.

In accordance with another aspect of the present invention, the method may also include authenticating that the printing request is a printing request from a valid user.

In accordance with another aspect of the present invention, the printer device may combine print form data and the data generated by the server in order to generate image data and print the image data generated.

In accordance with yet another aspect of the present invention, the information for acquiring the Web page indicating the state of processing of the print job may comprise identification information indicating the Web page.

In accordance with still another aspect of the present invention, the client displays the state of processing of the print job in a Web browser in accordance with the Web page transmitted to the client.

According to another aspect of the present invention, a method implemented by a server for notifying a state of printing processing is provided. The method is applied to a printing system in which the server is capable of communicating with a client and a printer device. The method includes: generating data in accordance with a printing request received from the client; transmitting the data generated to the printer device; acquiring a Web page indicating a state of processing of a print job, the Web page being provided by the printer device; and transmitting, to the client, the Web page acquired.

Further features and advantages of the present invention will become apparent from the following description of the preferred embodiments with reference to the attached drawings.

BRIEF DESCRIPTION OF THE DRAWINGS

FIG. 8 is an illustration showing an example of a printing request screen displayed in a Web browser on a client.

FIG. 9 is an illustration showing an example of a screen of a Web page displayed on the client.

FIG. 13 is an illustration showing an example of a screen of a Web page processed by the Web print server so as to be displayed on the client.

DESCRIPTION OF THE PREFERRED EMBODIMENTS

Embodiments of the present invention will be described with reference to the drawings.

First Embodiment

Figure 1:
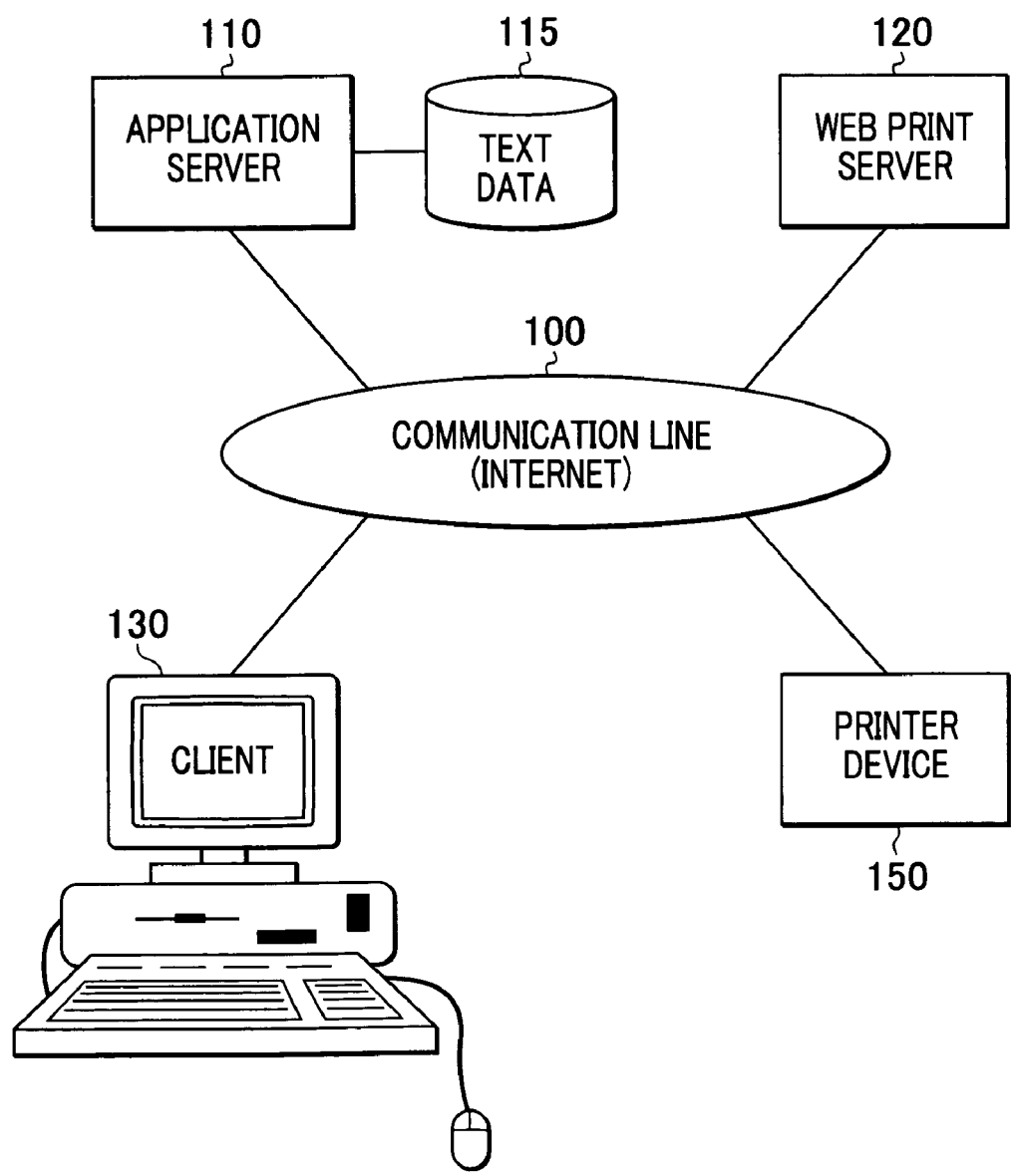
FIG. 1 is a block diagram showing the entire structure of a printing system according to a first embodiment of the present invention.

FIG. 1 is a block diagram showing the structure of a printing system according to a first embodiment of the present invention.

Referring to FIG. 1, an application server 110, a Web print server 120, a client 130, and a printer device 150 are connected to each other via a communication line 100.

The communication line 100 is, for example, any one of a local area network (LAN), such as the Internet or an intranet, a wide area network (WAN), a telephone line, a dedicated digital line, an asynchronous transfer mode (ATM), a frame relay line, a communication satellite line, a cable television line, a wireless channel for data broadcasting, and the like or a combination of some of them. The communication line 100 is a so-called communication network. Since the communication line 100 only needs to send and receive data, communication means from the client 130 to the application server 110, communication means from the application server 110 to the Web print server 120, and communication means from the Web print server 120 to the printer device 150 may be different from each other.

The application server 110 may be a personal computer (PC) server or a UNIX® server. The application server 110 is provided with a communication unit (not shown). Also, the application server 110 is connected to an external storage device, such as a hard disk, for storing text data 115, which is original data of a document to be printed.

The text data 115 is, for example, extensible markup language (XML) data including a tag and data details corresponding to the tag. However, the text data 115 is not necessarily limited to this. The text data 115 may be comma separated value (CSV) data or the like and may be in a database format (tabular database in which each sequence is defined).

The client 130 is, for example, a desktop personal computer, a notebook personal computer, a mobile personal computer, a personal data assistant (PDA), or the like. The client 130 may be a portable telephone containing a program function (i-mode® or the like).

Figure 2:
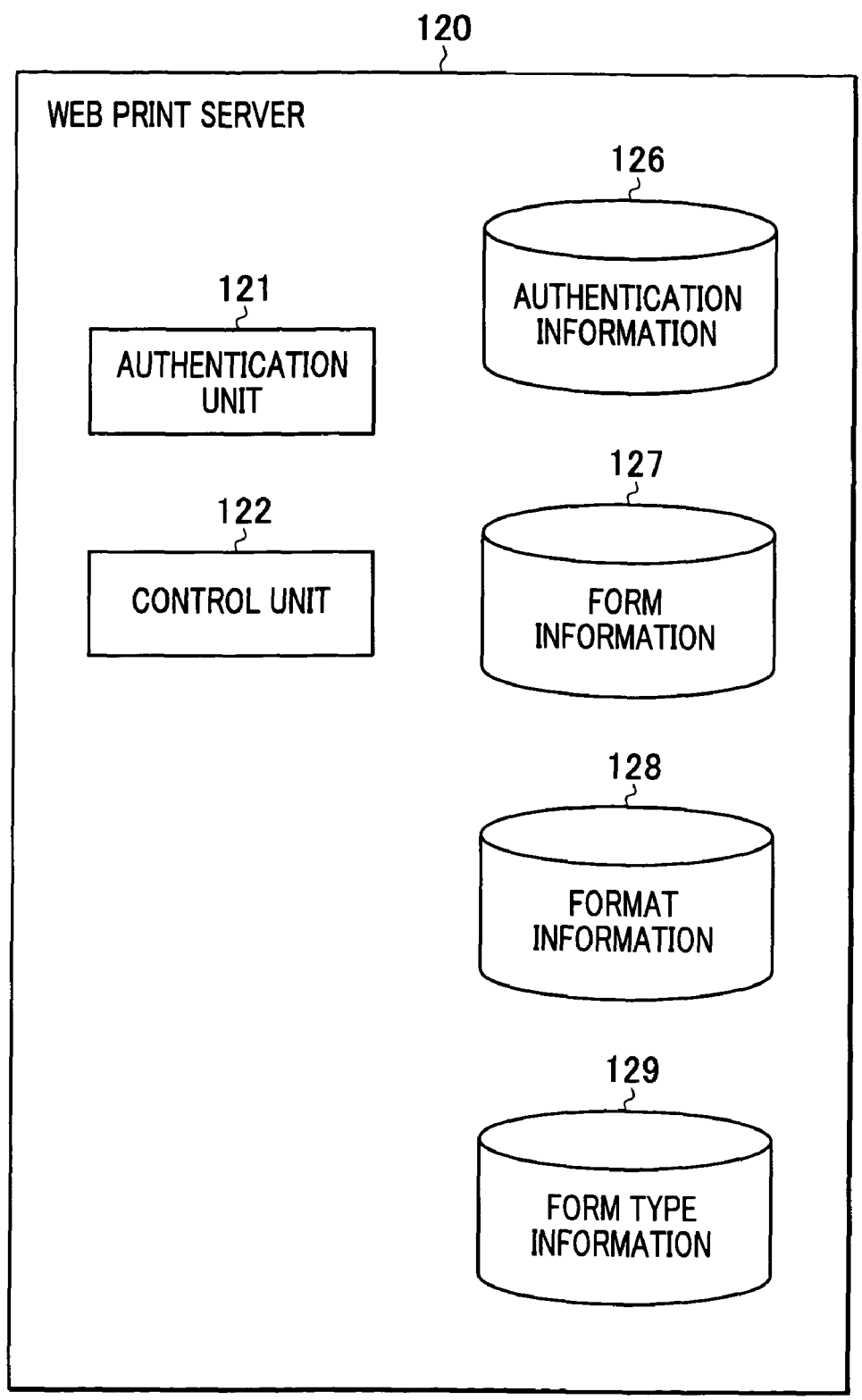
FIG. 2 is a block diagram showing the internal structure of a Web print server shown in FIG. 1.

FIG. 2 is a block diagram showing the internal structure of the Web print server 120 shown in FIG. 1.

The Web print server 120 includes storage, such as one or more hard disks for storing authentication information 126, form information 127, format information 128, and form type information 129. The Web print server 120 also includes a control unit 122 for generating character data for printing on the basis of the text data 115 (shown in FIG. 1) received from the application server 110 and the format information 128. The Web print server 120 also includes an authentication unit 121 for determining whether or not a request from the client 130 (shown in FIG. 1) is valid by referring to the authentication information 126.

Figure 3:
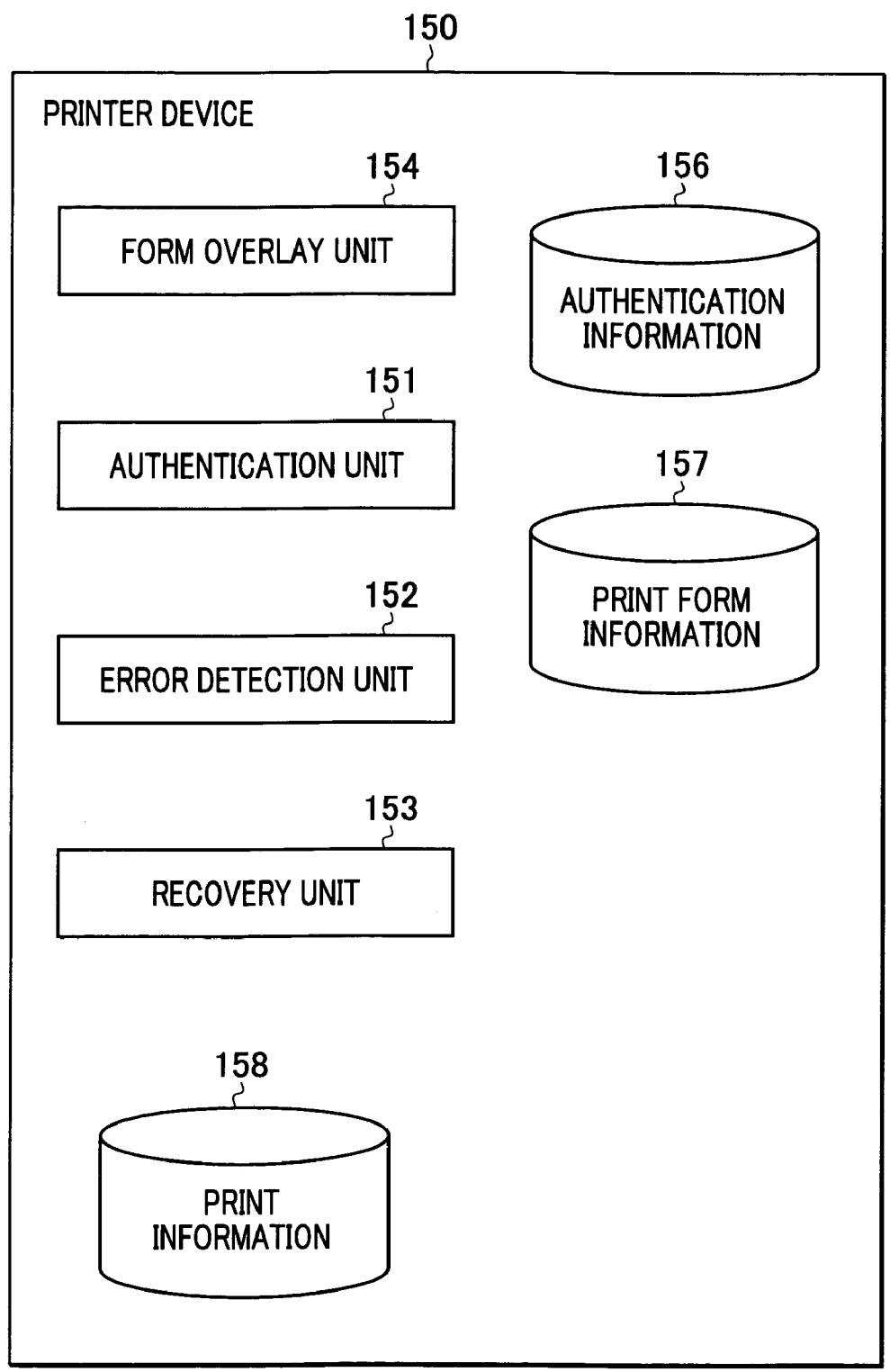
FIG. 3 is a block diagram showing the internal structure of a printer device shown in FIG. 1.

FIG. 3 is a block diagram showing the internal structure of the printer device 150 shown in FIG. 1.

The printer device 150 is a printer (for example, a laser printer) capable of being connected to a network. The printer device 150 includes storage, such as one or more hard disks for storing authentication information 156, print form information 157, print information 158 composed of printing data including character data for printing and control data. The printer device also includes a form overlay unit 154 for generating image data for printing by superimposing printing information on a print form, and an authentication unit 151 for determining whether or not a request from the Web print server 120 (shown in FIG. 1) is valid by referring to the authentication information 156. The printer device 150 may also be provided with an error detection unit 152 for detecting an error in the process of executing a print job and a recovery unit 153 for performing recovery processing when a predetermined error occurs.

Figure 4:
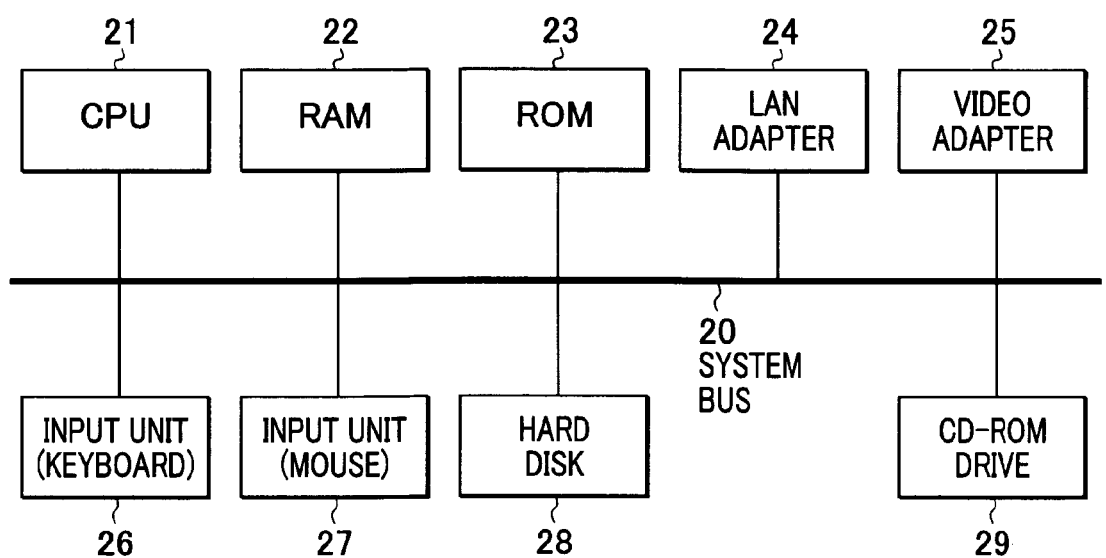
FIG. 4 is a block diagram showing the basic hardware structure of the Web print server and the printer device shown in FIG. 1.

FIG. 4 is a block diagram showing the basic hardware structure of the Web print server 120 and the printer device 150 shown in FIG. 1. Since the basic hardware structure of the Web print server 120 is the same as that of the printer device 150, only one of them is illustrated here.

Referring to FIG. 4, a central processing unit (CPU) 21, a random access memory (RAM) 22, a read-only memory (ROM) 23, a LAN adapter 24, a video adapter 25, an input unit (keyboard) 26, an input unit (mouse) 27, a hard disk 28, and a Compact Disk-Read Only Memory (CD-ROM) drive 29 are connected to each other via a system bus 20. The system bus 20 is, for example, a Peripheral Component Interconnect (PCI) bus, an Accelerated Graphics Port (AGP) bus, a memory bus, or the like. In FIG. 4, a connecting chip between buses, a keyboard interface, and an input-ouput interface, such as a so-called Small Computer System Interface (SCSI) or Advanced Technology Attachment Packet Interface (ATAPI), are not illustrated.

The CPU 21 controls hardware and performs various operations, such as rules of arithmetic and relational operations, on the basis of a program of an operating system (OS) and application programs. The RAM 22 stores the program of the OS, the application programs, and the like read from storage media, such as the hard disk 28 and a CD-ROM, a Compact Disk-Recordable (CD-R), and the like installed in the CD-ROM drive 29. These programs are executed by the CPU 21.

The ROM 23 stores a so-called Basic Input Output System (BIOS) and the like that cooperate with the OS to control input and output of data to and from the hard disk 28 and the like. The LAN adapter 24 cooperates with a communication program of the OS controlled by the CPU 21 to communicate with an external device connected via a network. The video adapter 25 generates an image signal to be output to a display device (not shown). The keyboard 26 and the mouse (pointing device) 27 are used for inputting an instruction to the application server 110 (shown in FIG. 1).

The hard disk 28 stores the OS and the application programs (for example, a control program for the Web print server 120, a form overlay program for the printer device 150, and an authentication program).

The CD-ROM drive 29 is used for mounting storage media, such as a CD-ROM, a CD-R, and a Compact Disk-Rewritable (CD-RW), to install the application programs on the hard disk 28. It is obvious that a CD-R drive, a CD-RW drive, a magneto-optical (MO) drive, and the like may be used, instead of the CD-ROM drive.

Figure 5:
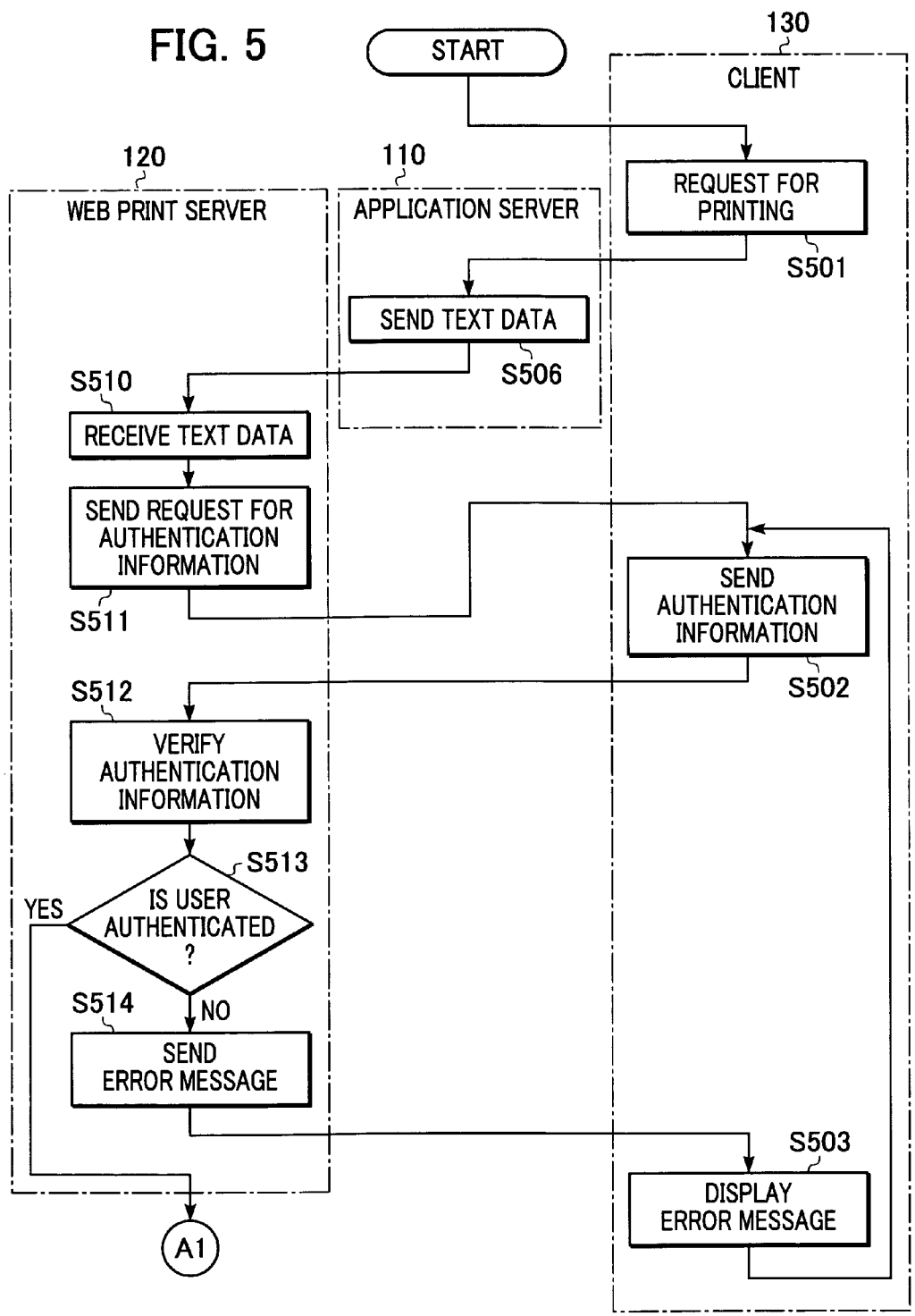
FIG. 5 is a flowchart (1/3) showing the process of printing processing performed by the printing system shown in FIG. 1.
Figure 6:
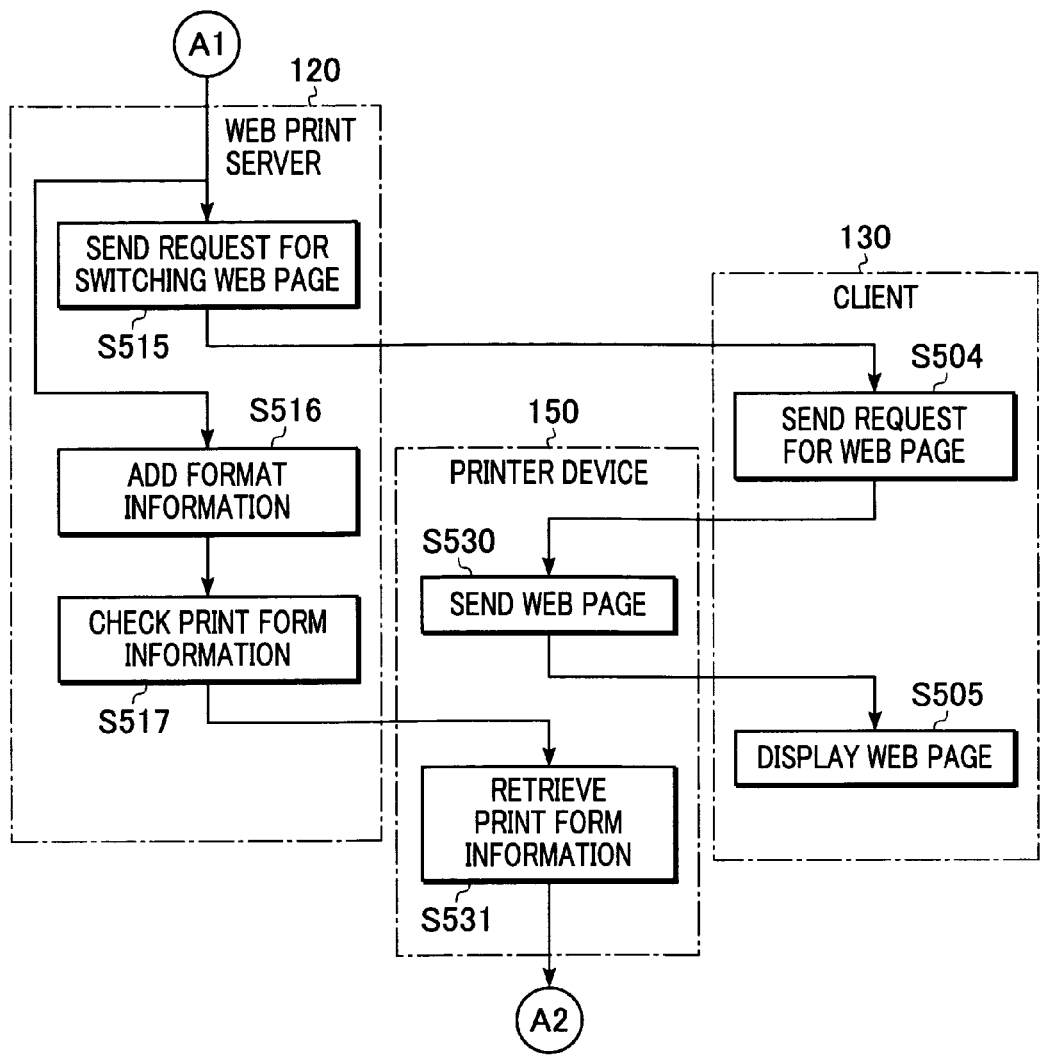
FIG. 6 is a flowchart (2/3) showing the process of the printing processing performed by the printing system shown in FIG. 1.
Figure 7:
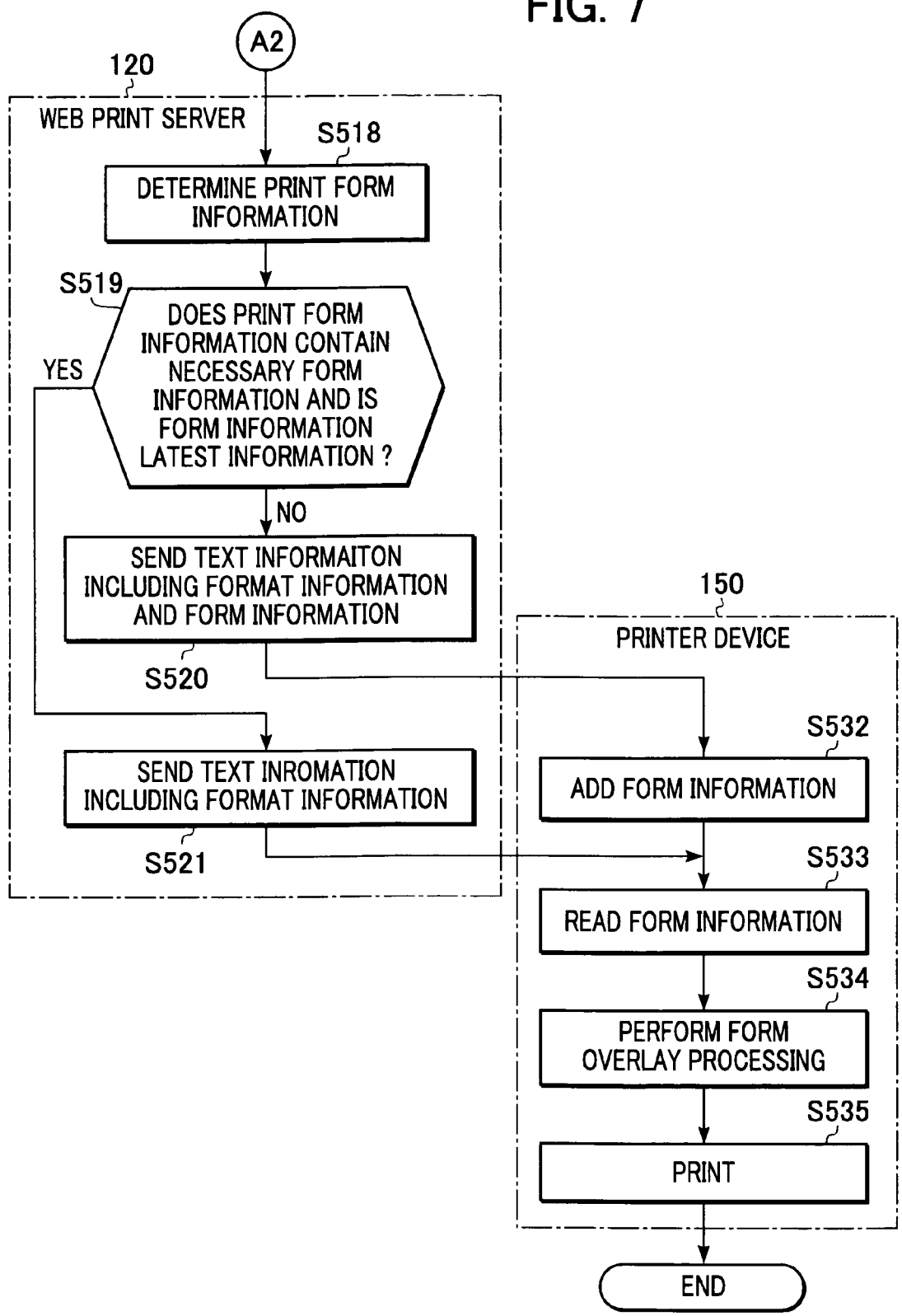
FIG. 7 is a flowchart (3/3) showing the process of the printing processing performed by the printing system shown in FIG. 1.

FIGS. 5 to 7 are flowcharts showing the process of printing processing performed by the print system shown in FIG. 1.

In the flowcharts, steps S501 to S505 are performed under the control of a CPU (not shown) of the client 130. Step S506 is performed under the control of a CPU (not shown) of the application server 110. Steps S510 to S521 are performed under the control of the CPU 21 of the Web print server 120. Steps S530 to S535 are performed under the control of the CPU 21 of the printer device 150.

Referring to FIG. 5, in step S501, the client 130 sends a printing request to the application server 110 via a Web browser. An example of a screen for the printing request displayed in the Web browser on the client 130 is shown in FIG. 8. On the printing request screen shown in FIG. 8, a user ID and a password are input and a print destination printer and a text extraction method are selected. When an OK button is pressed, a detail selection screen (not shown) corresponding to the text extraction method is displayed. On the detail selection screen, the name of a file, a retrieval condition for data extraction, the name of a document, or the name of a processing program is selected or designated.

Referring back to FIG. 5, in step S506, the application server 110 extracts the text data 115, which is an original of printing data, in accordance with the printing request sent in step S501, and sends the text data 115 to the Web print server 120. In the first embodiment, the text data 115 is in an XML data format. The text data 115 contains information (in the first embodiment, the client 130, the user ID, and the like) indicating who requested to generate the text data 115.

In step S510, a sending and receiving unit (not shown) of the Web print server 120 receives the text data 115. The text data 115 is stored in the RAM 22 of the Web print server 120. Then, in step S511, the authentication unit 121 of the Web print server 120 sends display data for displaying a screen for requesting authentication information to the Web browser on the client 130 by the authentication program. In step S502, a screen for requesting the user ID and the password is displayed on the display screen of the client 130, and the client 130 sends the user ID and the password to the Web print server 120. Then, the process proceeds to step S512.

In step S512, the authentication unit 121 of the Web print server 120 checks the user ID and the password sent from the client 130 against the authentication information 126. In step S513, it is determined whether or not the user is authenticated. If the user is authenticated (if the determination in step S513 is YES), the process proceeds to steps S515 and S516 shown in FIG. 6.

If the user is not authenticated in step S513 (if the determination in step S513 is NO), an error message is sent to the client 130 by the authentication program of the authentication unit 121 of the Web print server 120 (step S514). The error message is displayed in the Web browser on the client 130 and a screen for inputting authentication information is displayed (step S503). Then, the process returns to step S502.

Referring to FIG. 6, in step S516, the format information 128 is added to the text data 115 by the control program of the control unit 122 of the Web print server 120, in accordance with the text data 115 stored in the RAM 22 and the format information 128. This format information 128 includes, for example, information on control of feeding and ejecting paper, information on a paper size, information on designation of resolution, information on designation of one side or both sides of the paper, information on designation of a cassette, information on a toner saving mode, and the like. The information can be changed by the user.

In step S515, the Web print server 120 sends a request for switching a Web page to the client 130. The client 130 receives the Web page switching request, and requests the printer device 150 to send a Web page indicating the state of the print job in step S504. For example, the Web page switching request includes a uniform resource identifier (URI) that indicates a Web page of the printer device 150.

In step S530, the printer device 150 sends the Web page indicating the state of the print job (a list of the states of print jobs) to the client 130, and the Web page sent from the printer device 150 is displayed in the Web browser on the client 130 in step S505. An example of a screen of the Web page displayed on the client 130 is shown in FIG. 9.

When the format information 128 is added to the text data 115 in step S516, as described above, the Web print server 120 checks whether or not form information necessary for the current printing is contained in the print form information 157 of the printer device 150 (in step S517). In step S531, the print form information 157 of the printer device 150 is retrieved, and the retrieval result is sent to the Web print server 120.

Referring now to FIG. 7, in step S518, the Web print server 120 determines print information on the basis of the retrieval result sent from the printer device 150. In step S519, it is determined whether or not the print form information 157 of the printer device 150 contains the form information necessary for the current printing and whether or not the form information is the latest information. If it is determined that the print form information 157 of the printer device 150 contains the form information necessary for the current printing and that the form information is the latest information (if the determination in step S519 is YES), the text information including the format information 128 added thereto is sent to the printer device 150 (step S521). Then, the process proceeds to step S533.

In contrast, if it is determined that the print form information 157 of the printer device 150 does not contain the form information necessary for the current printing or if it is determined that the form information is not the latest information (if the determination in step S519 is NO), the Web print server 120 sends the text information including the format information 128 added thereto and the form information 127 (including the form information necessary for the current printing) of the Web print server 120 to the printer device 150 (step S520).

The printer device 150 receives the text information including the format information 128 added thereto and the form information 127. In step S532, the printer device 150 stores the text information including the format information 128 added thereto in the RAM 22 of the printer device 150 and adds the form information 127 (including the form information necessary for the current printing) to the print form information 157. Then, the process proceeds to step S533.

In step S533, the printer device 150 reads the form information necessary for the current printing from the print form information 157. In step S534, the form overlay unit 154 overlays the text information including the format information 128 added thereto and the form information read from the print form information 157, in accordance with the form overlay program, to generate image information for printing. Then, in step S535, the printer device 150 performs printing.

As described above, according to the first embodiment, when a user requests for printing from the Web browser on the client 130, after inputting authentication information, a screen in the Web browser is switched to a Web page indicating a "list of the states of print jobs" that is obtained from the printer device 150 (refer to step S505 in FIG. 6 and FIG. 9). From this display, the user can easily see whether or not a print job completes paper ejection. Thus, even if the printer device 150 is distant from the client 130, the user of the client 130 can easily see whether or not printing is completed.

According to the first embodiment, display in a Web browser on the client 130 is switched to a Web page indicating a "list of the states of print jobs" obtained from the printer device 150 in accordance with a Web page switching request sent from the Web print server 120 (refer to steps S515, S504, S530, and S505 in FIG. 6). However, instead of this, a method for opening a new Web browser for displaying the "list of the states of print jobs" obtained from the printer device 150 on the client 130 may be used. Alternatively, a method for dividing a screen in the Web browser on the client 130 and for displaying, together with a printing request screen, the "list of the states of print jobs" obtained from the printer device 150 may be used.

Second Embodiment

A second embodiment of the present invention will now be described.

Since the structure of the second embodiment is basically the same as the structure of the first embodiment, the structure of the first embodiment is used in the explanation for the second embodiment and only different component parts will be explained here.

In the second embodiment, the client 130 is a portable terminal containing a program function, such as i-mode®.

Figure 10:
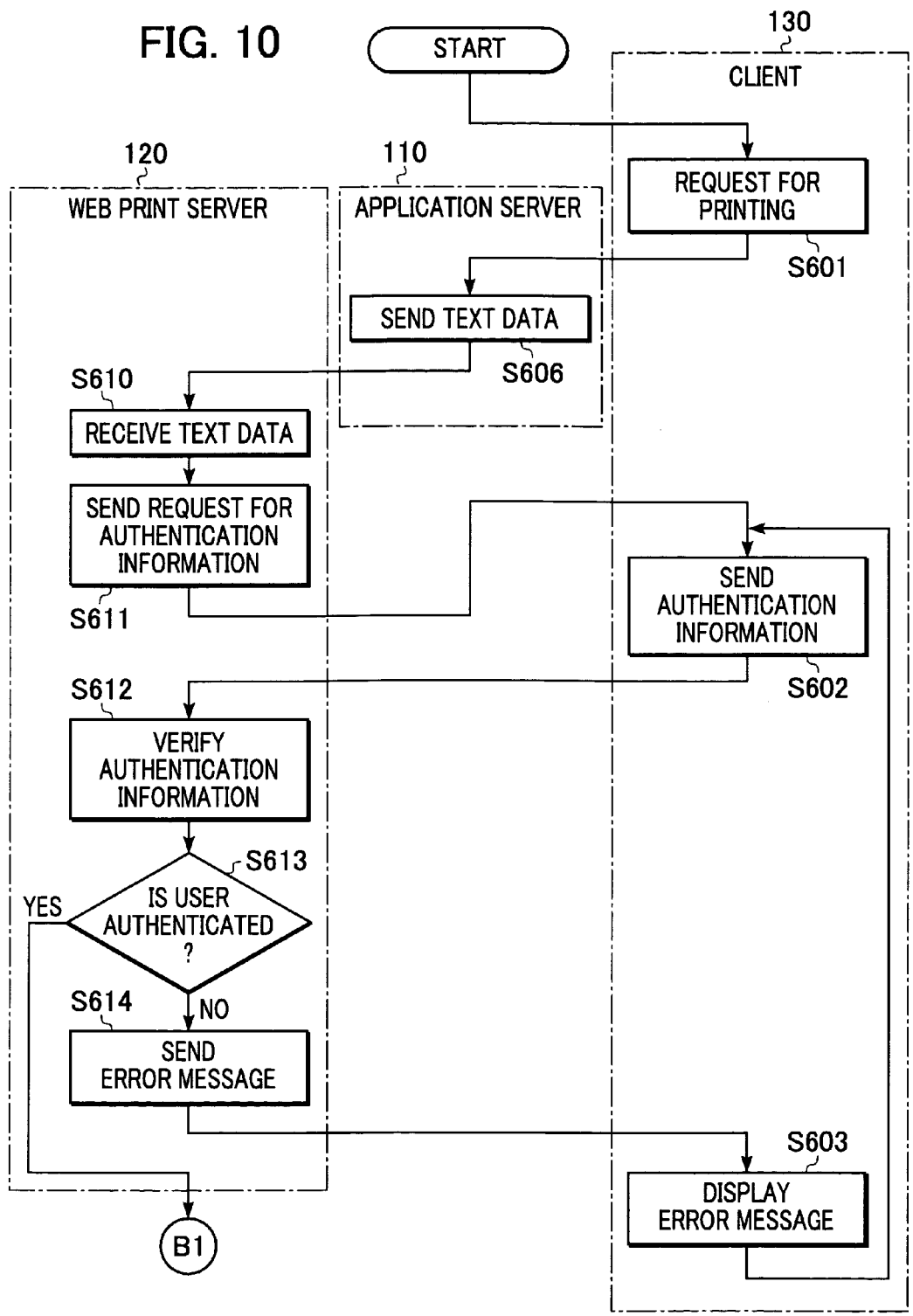
FIG. 10 is a flowchart (1/3) showing the process of printing processing performed by a printing system according to a second embodiment.
Figure 11:
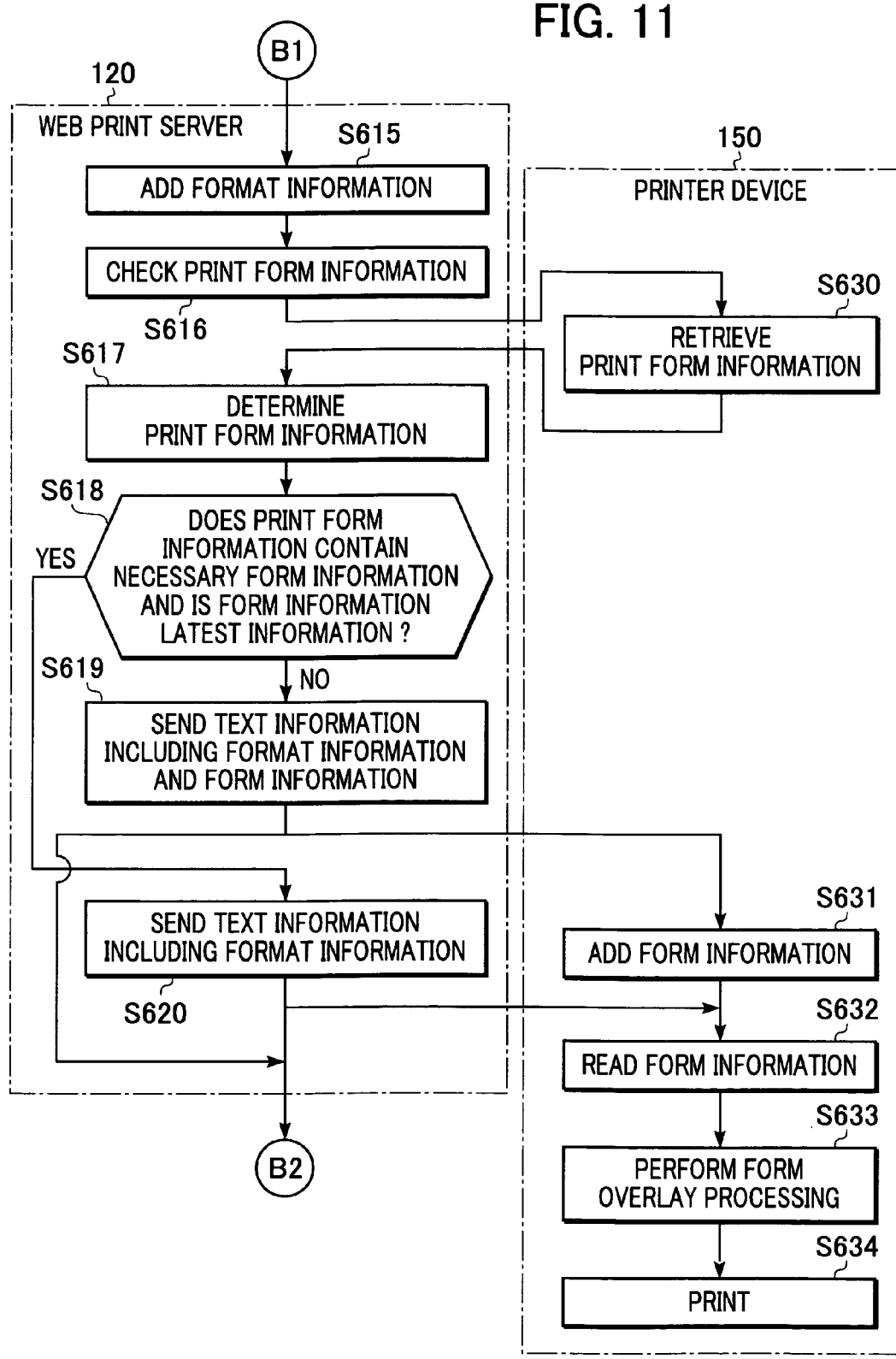
FIG. 11 is a flowchart (2/3) showing the process of the printing processing performed by the printing system according to the second embodiment.
Figure 12:
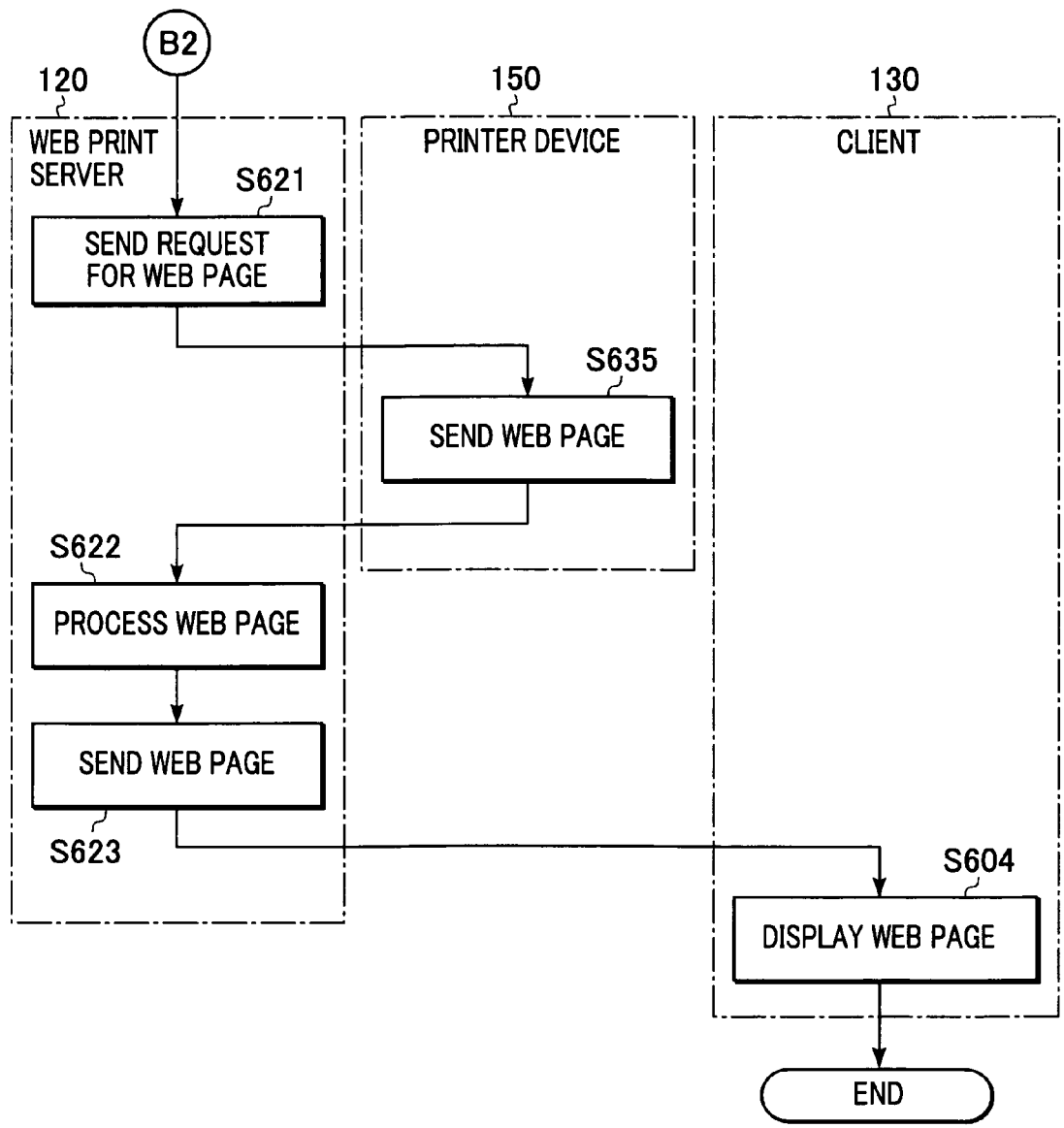
FIG. 12 is a flowchart (3/3) showing the process of the printing processing performed by the printing system according to the second embodiment.

FIGS. 10 to 12 are flowcharts showing the process of printing processing performed by a printing system according to the second embodiment.

In the flowcharts, steps S601 to S604 are performed under the control of a CPU (not shown) of the client 130. Step S606 is performed under the control of a CPU (not shown) of the application server 110. Steps S610 to S623 are performed under the control of the CPU 21 of the Web print server 120. Steps S630 to S635 are performed under the control of the CPU 21 of the printer device 150.

Referring to FIG. 10, in step S601, the client 130 sends a request for printing to the application server 110 via a Web browser. The screen for the printing request displayed in the Web browser on the client 130 is the same as the screen for the printing request in the first embodiment shown in FIG. 8.

In step S606, the application server 110 extracts the text data 115, which is an original of printing data, in accordance with the printing request sent in step S601, and sends the text data 115 to the Web print server 120. The text data 115 is in the XML data form in the second embodiment. The text data 115 contains information (in the second embodiment, the client 130, a user ID, and the like) indicating who requests to generate the text data 115.

In step S610, a sending and receiving unit (not shown) of the Web print server 120 receives the text data 115. The text data 115 is stored in the RAM 22 of the Web print server 120. Then, in step S611, the authentication unit 121 of the Web print server 120 sends display data for displaying a screen for requesting authentication information to the Web browser on the client 130 by an authentication program. In step S602, a screen for requesting a user ID and a password is displayed on a display screen of the client 130 and the client 130 sends the user ID and the password to the Web print server 120. Then, the process proceeds to step S612.

In step S612, the authentication unit 121 of the Web print server 120 checks the user ID and the password sent from the client 130 against the authentication information 126. In step S613, it is determined whether or not the user is authenticated. If the user is not authenticated (if the determination in step S613 is NO), an error message is sent to the client 130 by the authentication program of the authentication unit 121 (step S614). The error message is displayed in the Web browser on the client 130 and a screen for inputting authentication information is displayed (step S603). Then, the process returns to step S602.

If the user is authenticated in step S613 (if the determination in step S613 is YES), the process proceeds to step S615 shown in FIG. 11. The control unit 122 of the Web print server 120 adds the format information 128 to the text data 115 on the basis of the control program, in accordance with the text data 115 stored in the RAM 22 and the format information 128. This format information 128 includes, for example, information on control of feeding and ejecting paper, information on a paper size, information on designation of resolution, information on designation of one side or both sides of paper, information on designation of a cassette, information on a toner saving mode, and the like. The information can be changed by the user.

In step S616, the Web print server 120 checks whether or not form information necessary for the current printing is contained in the print form information 157 of the printer device 150. In step S630, the print form information 157 of the printer device 150 is retrieved, and the retrieval result is sent to the Web print server 120.

In step S617, the Web print server 120 determines print information on the basis of the retrieval result sent from the printer device 150. In step S618, it is determined whether or not the print form information 157 of the printer device 150 contains the form information necessary for the current printing and whether or not the form information is the latest information. If it is determined that the print form information 157 of the printer device 150 contains the form information necessary for the current printing and that the form information is the latest information (if the determination in step S618 is YES), the text information including the format information 128 added thereto is sent to the printer device 150 (step S620). Then, the process proceeds to step S632 and step S621 shown in FIG. 12.

In contrast, if it is determined that the print form information 157 of the printer device 150 does not contain the form information necessary for the current printing or if it is determined that the form information is not the latest information (if the determination in step S618 is NO), the Web print server 120 sends the text information including the format information 128 added thereto and the form information 127 (including the form information necessary for the current printing) of the Web print server 120 to the printer device 150 (step S619). After performing step S619, the process proceeds to step S631 and step S621 shown in FIG. 12.

The printer device 150 receives the text information including the format information 128 added thereto and the form information 127. In step S631, the printer device 150 stores the text information including the format information 128 added thereto in the RAM 22 of the printer device 150 and adds the form information 127 (including the form information necessary for the current printing) to the print form information 157. Then, the process proceeds to step S632.

In step S632, the printer device 150 reads the form information necessary for the current printing from the print form information 157. In step S633, the form overlay unit 154 overlays the text information including the format information 128 added thereto and the form information read from the print form information 157, in accordance with the form overlay program, to generate image information for printing. Then, in step S634, the printer device 150 performs printing.

In step S621 shown in FIG. 12, the Web print server 120 requests the printer device 150 to send a Web page. In step S635, the printer device 150 sends the Web page indicating the state of a print job (a list of the states of printing jobs) to the Web print server 120. The Web print server 120 receives the Web page from the printer device 150, processes the Web page (for example, shown in FIG. 9) so as to be displayed by i-mode® of the client 130, which is a portable terminal (step S622), and sends the processed Web page to the client 130 in step S623. FIG. 13 shows an example of a screen of the Web page processed by the Web print server 120 so as to be displayed on the client 130.

In step S604, the client 130 displays the processed Web page sent from the Web print server 120 on the display screen.

Here, processing, such as extracting only a job record that satisfies a particular condition, such as "a job of the name of a user who requests for printing," may be performed in the processing for the Web page in step S622.

Also, processing, such as embedding link information, such as "return to a screen for printing provided by a Web print server," for another Web page, may be performed in the processing for the Web page in step S622.

As described above, according to the second embodiment, a user requests for printing from a Web browser on the client 130, which is a portable terminal. When the Web print server 120 completes printing processing (when step S619 or step S620 is completed), a screen in the Web browser on the client 130 is switched to a Web page indicating a "list of the states of print jobs" that is obtained from the printer device 150 (refer to steps S621, S635, S622, and S623 in FIG. 12 and FIG. 13). From this display, the user can easily see whether or not a print job completes paper ejection. Thus, even if the printer device 150 is distant from the client 130, the user of the client 130 can easily see whether or not printing is completed.

Other Embodiments

A storage medium on which program code of software for realizing the functions of the embodiments described above may be recorded to a system or a device and may cause a computer (or a CPU or an micro-processing unit (MPU)) of the system or the device to read and execute the program code stored in the storage medium.

In this case, the program code read from the storage medium realizes functions of the embodiments described above.

Also, the storage medium for supplying the program code may be, for example, a floppy disk, a hard disk, a magnetic optical disk, a CD-ROM, a CD-R, a CD-RW, a Digital Versatile Disc-Read-only Memory (DVD-ROM), a DVD-RAM, a DVD-RW, a DVD-R, a magnetic tape, a nonvolatile memory card, a ROM, and the like.

Also, the functions of the embodiments described above can be realized not only by executing the read program code by the computer but also by performing part or all of the actual processing by an operating system (OS) or the like running on the computer on the basis of instructions of the program code.

Furthermore, the functions of the embodiments described above can also be realized by performing part or all of the actual processing by a CPU or the like arranged in a function extension board of the computer or a function extension unit connected to the computer on the basis of instructions of program code read from the storage medium after the program code is written in a memory of the function extension board or the function extension unit.

As described above, when a user requests for printing from a Web browser on a client or when printing processing is completed, a screen in the Web browser is switched to a Web page indicating a "list of the states of print jobs" obtained from a printer device.

Accordingly, a user can easily keep track of the state of a print job until completion of paper ejection by simply looking at the display in the Web browser on the client 130. Thus, even if the location of the printer device 150 is distant from the location of the client 130, the user of the client 130 can easily see whether or not printing is completed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method executed by a server for communicating with a client device and a printer device through a network, the server, the client device and the printer device each being a different device from the other, and the server having form information, the method comprising:
    receiving a printing request from the client device;
    determining whether the printer device has the form information that the server has and that corresponds to the printing request;
    transmitting, in a case where it is determined that the printer device does not have the form information that the server has and that corresponds to the printing request, print data including the form information and original information to be printed to the printer device without going through the client device, in accordance with the received printing request; and
    transmitting, to the client device, address information for causing the client device to acquire, from the printer device without going through the server, a Web page provided by the printer device, the Web page indicating a state of processing of the transmitted print data, wherein the client device acquires the Web page from the printer device in accordance with the address information and displays the state of processing of the print data in accordance with the Web page,
    wherein the print data including the form information and the original information is used in generating image data for printing by the printer device.

2. A method according to claim 1, further comprising authenticating that the printing request is a printing request from a valid user, wherein, if the printing request is the printing request from the valid user, the server transmits the print data to the printer device.

3. A method according to claim 1, wherein the printer device combines print form data and the print data transmitted by the server in order to generate the image data for printing.

4. A method according to claim 1, wherein the address information for causing the client device to acquire the Web page from the printer device comprises a uniform resource identifier of a Web page indicating the state of processing of the transmitted print data.

5. A method according to claim 4, wherein the client device displays the state of processing of the print data in a Web browser in accordance with the Web page acquired by the client device.

6. An information processing device for communicating with an external device and a printer device through a network, the information processing device, the external device and the printer device each being a different device from the other, the information processing device comprising:
    a storage unit configured to store form information;
    a request receiving unit configured to receive a printing request from the external device;
    a form information determination unit configured to determine whether the printer device has the form information that is stored in the storage unit and that corresponds to the printing request;
    a data transmission unit configured to, in a case the form information determination unit determines that the printer device does not have the form information that is stored in the storage unit and that corresponds to the printing request, transmit print data including the form information and original information to be printed to the printer device without going through the external device in accordance with the printing request received by the request receiving unit;

a transmission unit configured to transmit, to the external device, address information for causing the external device to acquire, from the printer device without going through the information processing device, a Web page provided by the printer device, the Web page indicating a state of processing of the print data transmitted by the data transmission unit, wherein the external device acquires the Web page from the printer device in accordance with the address information and displays the state of processing of the print data in accordance with the Web page, wherein the print data including the form information and the original information is used in generating image data for printing by the printer device.

7. An information processing device according to claim 6, further comprising an authenticating unit configured to authenticate that the printing request is a printing request from a valid user, wherein, if the printing request is the printing request from the valid user, the data transmission unit transmits the print data to the printer device.

8. An information processing device according to claim 6, wherein the printer device combines print form data and the print data transmitted by the data transmission unit in order to generate the image data for printing.

9. An information processing device according to claim 6, wherein the address information for causing the external device to acquire the Web page from the printer device comprises a uniform resource identifier of a Web page indicating the state of processing of the transmitted print data.

10. An information processing device according to claim 9, wherein the external device displays the state of processing of the print data in a Web browser in accordance with the Web page acquired by the external device.

11. An information processing device according to claim 6, further comprising:

a print data generating unit configured to generate the print data, wherein the data transmission unit transmits the print data generated by the print data generating unit to the printer device.

12. A non-transitory computer-readable medium having a program stored thereon for controlling a computer of a server for communicating with an external device and a printer device, the server, the external device and the printer device each being a different device from the other and the server having form information, the program causing the computer to execute a method comprising:

receiving a printing request from the external device;

determining whether the printer device has the form information that the server has and that corresponds to the printing request;

transmitting, in a case where it is determined that the printer device does not have the form information that the server has and that corresponds to the printing request, print data including the form information and original information to be printed to the printer device without going through the external device in accordance with the received printing request;

transmitting to the external device, address information for causing the external device to acquire, from the printer device without going through the server, a Web page provided by the printer device, the Web page indicating a state of processing of the transmitted print data, wherein the external device acquires the Web page from the printer device in accordance with the address information and displays the state of processing of the print data in accordance with the Web page;

wherein the print data including the form information and the original information is used in generating image data for printing by the printer device.

13. A non-transitory computer-readable medium according to claim 12, wherein the method further comprises authenticating that the printing request is a printing request from a valid user, wherein, if the printing request is the printing request from the valid user, the server transmits the print data to the printer device.

14. A non-transitory computer-readable medium according to claim 12, wherein the printer device combines print form data and the print data transmitted by the server in order to generate the image data for printing.

15. A non-transitory computer-readable medium according to claim 14, wherein the address information for causing the external device to acquire the Web page comprises a uniform resource identifier of a Web page indicating the state of processing of the transmitted print data.

16. A non-transitory computer-readable medium according to claim 15, wherein the external device displays the state of processing of the print data in accordance with the Web page acquired by the external device.

17. An information processing device for communicating with an external device and a printer device through a network, the information processing device, the external device and the printer device each being a different device from the other, the information processing device comprising:

a storage unit configured to store form information;

a request receiving unit configured to receive a printing request from the external device;

a form information determination unit configured to determine whether the printer device has the form information that is stored in the storage unit and that corresponds to the printing request;

a data transmission unit configured to, in a case the form information determination unit determines that the printer device does not have the form information that is stored in the storage unit and that corresponds to the printing request, transmit print data including the form information and original information to be printed to the printer device without going through the external device, in accordance with the printing request received by the request receiving unit;

a transmission unit configured to transmit, to the external device, a Web page provided by the printer device, the Web page indicating a state of processing of the print data transmitted by the data transmission unit, wherein the external device displays the state of processing of the print data in accordance with the Web page, wherein the print data including the form information and the original information is used in generating image data for printing by the printer device.

18. An information processing device according to claim 17, further comprising:

a print data generating unit configured to generate the print data, wherein the data transmission unit transmits the print data generated by the print data generating unit to the printer device.

19. An information processing device according to claim 17, further comprising:
   an acquiring unit configured to acquire a Web page provided by the printer device from the printer device, the acquired Web page indicating the state of processing of the print data transmitted by the data transmission unit; and
   a processing unit configured to process the Web page acquired by the acquiring unit, wherein the transmission unit transmits the processed Web page to the external device.

* * * * *